US008923427B2

(12) United States Patent
Gomadam

(10) Patent No.: US 8,923,427 B2
(45) Date of Patent: Dec. 30, 2014

(54) CODEBOOK SUB-SAMPLING FOR FREQUENCY-SELECTIVE PRECODING FEEDBACK

(71) Applicant: Marvell World Trade Ltd., St. Michael (BB)

(72) Inventor: Krishna Srikanth Gomadam, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 61 days.

(21) Appl. No.: 13/669,477

(22) Filed: Nov. 6, 2012

(65) Prior Publication Data

US 2013/0114655 A1     May 9, 2013

Related U.S. Application Data

(60) Provisional application No. 61/556,757, filed on Nov. 7, 2011.

(51) Int. Cl.
| | |
|---|---|
| *H04B 7/02* | (2006.01) |
| *H04L 1/02* | (2006.01) |
| *H04B 7/04* | (2006.01) |
| *H04B 7/06* | (2006.01) |
| *H04B 1/38* | (2006.01) |
| *H04L 1/00* | (2006.01) |

(52) U.S. Cl.
CPC ............... *H04B 1/38* (2013.01); *H04B 7/0456* (2013.01); *H04B 7/0641* (2013.01); *H04L 1/0029* (2013.01); *H04B 7/0619* (2013.01); *H04B 7/0469* (2013.01); *H04B 7/066* (2013.01); *H04B 7/0617* (2013.01); *H04B 7/0632* (2013.01); *H04B 7/0478* (2013.01); *H04L 1/0031* (2013.01)
USPC ........... 375/267; 375/260; 375/296; 375/297; 455/69

(58) Field of Classification Search
CPC .. H04B 7/0639; H04B 7/0626; H04B 7/0456; H04B 7/0632; H04B 7/0478; H04B 7/065; H04B 7/0636; H04B 7/0658; H04L 1/0026
USPC ..................... 375/260, 267, 296–297; 455/69
See application file for complete search history.

(56) References Cited

U.S. PATENT DOCUMENTS

| | | | |
|---|---|---|---|
| 5,231,629 A | 7/1993 | Kotzin et al. | |
| 5,263,160 A | 11/1993 | Porter, Jr. et al. | |

(Continued)

FOREIGN PATENT DOCUMENTS

| | | |
|---|---|---|
| EP | 2182754 A1 | 5/2010 |
| GB | 2456217 A | 7/2009 |

(Continued)

OTHER PUBLICATIONS

U.S. Appl. No. 12/902,168 Office Action dated Aug. 5, 2013.

(Continued)

*Primary Examiner* — Curtis Odom

(57) ABSTRACT

A method includes, in a mobile communication terminal, holding a definition of a sub-sampled codebook identifying precoding matrices, which are selected from a master codebook that is made-up of a wideband codebook and a frequency-selective codebook. The definition defines a first subset of the wideband codebook and a second subset of the frequency-selective codebook. The second subset of the frequency-selective codebook is represented using no more than two bits. A Multiple-Input Multiple-Output (MIMO) signal is received in the terminal. Based on the received MIMO signal, one or more precoding matrices are selected from the sub-sampled codebook for precoding subsequent MIMO signals transmitted to the terminal, and precoding feedback indicating the selected precoding matrices is calculated. The precoding feedback is transmitted from the terminal.

18 Claims, 2 Drawing Sheets

(56) References Cited

U.S. PATENT DOCUMENTS

| | | |
|---|---|---|
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0240274 A1 | 10/2008 | Han et al. |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0052405 A1 | 2/2009 | Ko et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252332 A1 | 10/2009 | Chang et al. |
| 2009/0252333 A1 | 10/2009 | Chang et al. |
| 2009/0274225 A1 | 11/2009 | Khojastepour et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshno et al. |
| 2010/0296603 A1 | 11/2010 | Lee et al. |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0150052 A1 | 6/2011 | Erell et al. |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2011/0310752 A1 | 12/2011 | Kim et al. |
| 2012/0002568 A1 | 1/2012 | Tiirola et al. |
| 2012/0020433 A1 | 1/2012 | Bhattad et al. |
| 2012/0033592 A1 | 2/2012 | Kim et al. |
| 2012/0033630 A1 | 2/2012 | Chung et al. |
| 2012/0039369 A1 | 2/2012 | Choi et al. |
| 2012/0058735 A1 | 3/2012 | Vermani et al. |

(56) References Cited

U.S. PATENT DOCUMENTS

| | | | |
|---|---|---|---|
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0076028 A1* | 3/2012 | Ko et al. | 370/252 |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0219042 A1 | 8/2012 | Onggosanusi et al. | |
| 2012/0219083 A1 | 8/2012 | Tong et al. | |
| 2012/0250550 A1 | 10/2012 | Gomadam et al. | |
| 2012/0257664 A1 | 10/2012 | Yue et al. | |
| 2012/0275376 A1 | 11/2012 | Sampath et al. | |
| 2012/0275386 A1 | 11/2012 | Frenne et al. | |
| 2012/0281620 A1 | 11/2012 | Sampath et al. | |
| 2013/0028068 A1 | 1/2013 | Park et al. | |
| 2013/0028344 A1 | 1/2013 | Chen et al. | |
| 2013/0039284 A1 | 2/2013 | Marinier et al. | |
| 2013/0051256 A1 | 2/2013 | Ong et al. | |
| 2013/0089158 A1 | 4/2013 | Wu et al. | |
| 2013/0107916 A1 | 5/2013 | Liu et al. | |
| 2013/0176991 A1 | 7/2013 | Yi | |
| 2013/0182786 A1 | 7/2013 | Frenne et al. | |

FOREIGN PATENT DOCUMENTS

| | | |
|---|---|---|
| JP | 2008236222 A | 2/2008 |
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008085096 A1 | 7/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
JP Patent Application # 2011-544111 Official Action dated Nov. 6, 2012.
U.S. Appl. No. 13/672,727, filed Nov. 9, 2012.
U.S. Appl. No. 13/669,476, filed Nov. 6, 2012.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
Zte, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 13/409,130, filed Mar. 1, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subspace-Based Channel Quantization for Distributed Cooperative Antenna Systems with Temporarily Correlated Channels", EURASIP Journal on Advances in Signal Processing, vol. 2008, Nov. 23, 2007.
NTT DOCOMO, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
U.S. Appl. No. 61/585,556, filed Jan. 11, 2012.
3GPP TS 36.213, "3rd Generation Partnership Project; Technical Specification Group Radio Access Network; Evolved Universal Terrestrial Radio Access (E-UTRA); Physical layer procedures (Release 10)", version 10.3.0., Sep. 2011.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT DOCOMO, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access

(56) References Cited

OTHER PUBLICATIONS (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TS RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Re1.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TS-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
U.S. Appl. No. 12/965,878 Office Action dated Oct. 24, 2013.
U.S. Appl. No. 13/052,075 Notice of Allowance dated Nov. 8, 2013.
JP Patent Application # 2011-551560 Office Action dated Oct. 29, 2013.
JP Patent Application # 2012-506601 Office Action dated Oct. 22, 2013.
U.S. Appl. No. 13/543,835 Office Action dated Nov. 22, 2013.
U.S. Appl. No. 12/965,878 Notice of Allowance dated Feb. 10, 2014.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TS-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TS RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.

(56) References Cited

OTHER PUBLICATIONS

Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT DOCOMO et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TS RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "On the use of pre-coding in E-UTRA", 3GPP TSG RAN WG1 # 47, 3 pages, Riga, Latvia, Nov. 6-10, 2006.
Chinese Patent Application 201080057652.9 Office Action dated Apr. 1, 2014.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT DOCOMO, 3GPP TSG RAN WG1, "Views on Scalable CSI Feedback for DL CoMP in LTE-Advanced" , Meeting #58bis, R1-094243, pp. 1-5, Oct. 12-16, 2009.
NTT DOCOMO, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,476 Office Action dated Oct. 9, 2014.
European Application # 11154002.7 Search Report dated Sep. 19, 2014.
JP Application # 2013-146952 Office Action dated Jul. 29, 2014.
Ericsson., "Precoding Considerations in LTE MIMO Downlink", TSG-RAN WGI1 #47bis, 12 pages, Sorrento, Italy, Jan. 15-19, 2007.
U.S. Appl. No. 14/215,093 Office Action dated Oct. 16, 2014.

* cited by examiner

US 8,923,427 B2

CODEBOOK SUB-SAMPLING FOR FREQUENCY-SELECTIVE PRECODING FEEDBACK

CROSS-REFERENCE TO RELATED APPLICATIONS

This application claims the benefit of U.S. Provisional Patent Application 61/556,757, filed Nov. 7, 2011, whose disclosure is incorporated herein by reference.

FIELD OF THE DISCLOSURE

The present invention relates generally to wireless communication, and particularly to methods and systems for providing channel feedback in wireless communication systems.

BACKGROUND

In some communication systems, a mobile communication terminal receives downlink signals from a base station over a communication channel, and sends feedback indicative of the response of the communication channel to the base station. The base station configures subsequent transmissions based on the feedback.

Channel feedback of this sort is used, for example, in Evolved Universal Terrestrial Radio Access (E-UTRA) systems specified by the 3rd Generation Partnership Project (3GPP). These systems are also referred to as Long Term Evolution (LTE) and LTE Advanced (LTE-A) Channel feedback schemes for E-UTRA are specified, for example, in 3GPP Technical Specification TS 36.213, entitled "LTE; Evolved Universal Terrestrial Radio Access (E-UTRA); Physical Layer Procedures," version 10.3.0, Release 10, September, 2011, which is incorporated herein by reference.

The description above is presented as a general overview of related art in this field and should not be construed as an admission that any of the information it contains constitutes prior art against the present patent application.

SUMMARY

An embodiment that is described herein provides a method including, in a mobile communication terminal, holding a definition of a sub-sampled codebook identifying precoding matrices, which are selected from a master codebook that is made-up of a wideband codebook and a frequency-selective codebook. The definition defines a first subset of the wideband codebook and a second subset of the frequency-selective codebook. The second subset of the frequency-selective codebook is represented using no more than two bits. A Multiple-Input Multiple-Output (MIMO) signal is received in the terminal. Based on the received MIMO signal, one or more precoding matrices are selected from the sub-sampled codebook for precoding subsequent MIMO signals transmitted to the terminal, and precoding feedback indicating the selected precoding matrices is calculated. The precoding feedback is transmitted from the terminal.

In some embodiments, selecting the precoding matrices includes selecting a single precoding matrix from the first subset, and selecting from the second subset multiple precoding matrices corresponding to multiple respective spectral sub-bands.

In some disclosed embodiments, holding the definition includes defining multiple first subsets and multiple second subsets for multiple respective ranks of the MIMO signal. In an example embodiment, defining the second subsets includes defining each second subset to include only a single precoding matrix for any rank that is higher than a predefined threshold rank. In another embodiment, defining the second subsets includes defining each second subset to include no more than two precoding matrices for any rank that is higher than a predefined threshold rank.

In yet another embodiment, transmitting the precoding feedback includes sending the precoding feedback over a Physical Uplink Shared Channel (PUSCH). In still another embodiment, the wideband codebook and the frequency-selective codebook are each formed of sixteen precoding matrices having first indices {0 . . . 15} and second indices {0 . . . 15}, respectively, the first subset is formed of the precoding matrices having the first indices {0, 1, 2, . . . , 13, 14}, and the second subset is formed of the precoding matrices having the second indices {0, 1, 2, 3} or the precoding matrices having the second indices {0, 1, 4, 5}.

In an embodiment, holding the definition includes sub-sampling the master codebook only for ranks of the MIMO signal that are higher than one. In a disclosed embodiment, calculating the feedback includes calculating multiple Channel Quality Indicators (CQIs) for multiple respective spectral sub-bands, and differentially encoding the multiple CQIs.

There is additionally provided, in accordance with an embodiment that is described herein, apparatus including a memory, a receiver, processing circuitry and a transmitter. The memory is configured to hold a definition of a sub-sampled codebook identifying precoding matrices, which are selected from a master codebook that is made-up of a wideband codebook and a frequency-selective codebook. The definition defines a first subset of the wideband codebook and further defines a second subset of the frequency-selective codebook, such that the second subset of the frequency-selective codebook is represented using no more than two bits. The receiver is configured to receive a Multiple-Input Multiple-Output (MIMO) signal. The processing circuitry is configured to select from the sub-sampled codebook, based on the received MIMO signal, one or more precoding matrices for precoding subsequent MIMO signals transmitted to the receiver, and to calculate precoding feedback indicating the selected precoding matrices. The transmitter is configured to transmit the precoding feedback.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
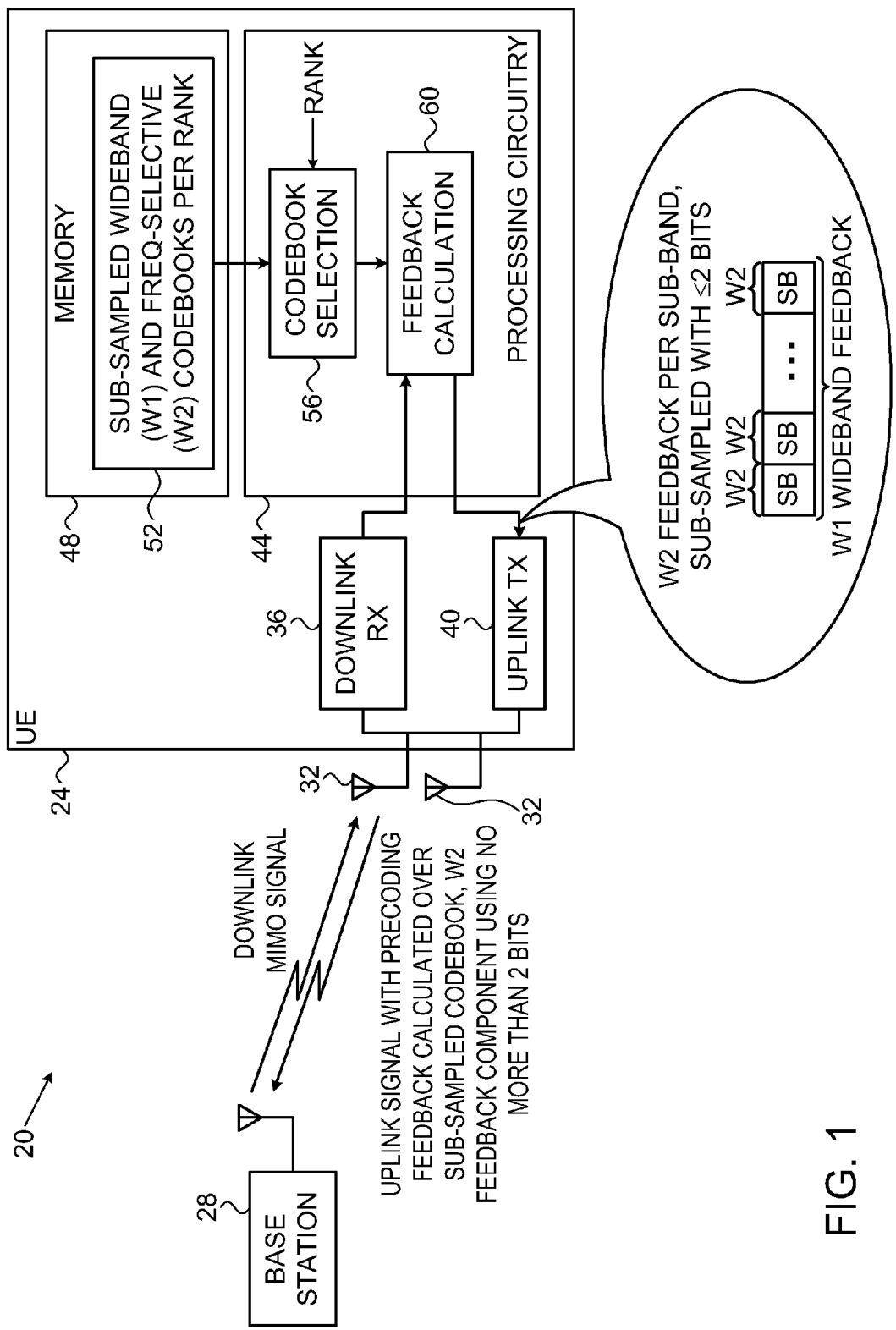
FIG. 1 is a block diagram that schematically illustrates a communication system, in accordance with an embodiment that is described herein.

Embodiments that are described herein provide improved channel feedback schemes for use in LTE, LTE-A and other suitable mobile wireless communication networks. In some embodiments, a mobile communication terminal (also referred to as User Equipment—UE) receives a downlink Multiple-Input Multiple Output (MIMO) signal from a base station (also referred to herein as eNodeB). The received downlink signal is typically precoded with a certain precoding scheme—A set of weights that are applied to the eNodeB antennas. Each precoding scheme is typically represented by a precoding matrix. Based on the received downlink signal, the UE calculates precoding feedback that is indicative of the precoding matrix preferred by the UE for precoding subsequent transmissions by the eNodeB. (The precoding scheme that is applied by the eNodeB typically comprises a suitable set of weights applied to the eNodeB transmit antennas.) The UE then transmits the precoding feedback to the eNodeB.

In an embodiment, the UE selects the preferred precoding matrix from a codebook that is agreed upon between the UE and the eNodeB, and the precoding feedback indicates an index that indicates the selected precoding matrix in the codebook to the eNodeB. This sort of feedback is sometimes referred to as Precoding Matrix Indication (PMI). Typically, the codebook is defined per rank, i.e., per each number of simultaneous data streams (also referred to as spatial streams or spatial layers) that are transmitted from the eNodeB to the UE in the downlink MIMO signal.

In some embodiments, the UE transmits the precoding feedback to the eNodeB, possibly along with other types of feedback, over a Physical Uplink Shared Channel (PUSCH). The PUSCH has only a limited number of bits for allocating to feedback information. Therefore, in the disclosed embodiments, the UE uses a sub-sampled codebook that is selected from a certain master codebook in order to reduce the feedback bandwidth. The disclosed embodiments provide several examples of sub-sampled precoding codebooks for use over the PUSCH in various operational modes.

In some embodiments, the master codebook is made-up of a combination of a wideband codebook denoted W1 and a frequency-selective codebook denoted W2. The wideband codebook is typically applicable to the entire downlink bandwidth allocated to system 20, while the frequency-selective codebook is typically applicable to narrower spectral sub-bands of the allocated bandwidth. Each precoding scheme in this embodiment comprises a precoding matrix selected from the wideband codebook, and one or more precoding matrices selected from the frequency selective codebook for use in one or more respective spectral sub-bands. Since the W2 codebook is frequency-selective, the precoding scheme typically comprises multiple precoding matrices selected from the frequency selective codebook for use in multiple respective sub-bands.

Typically, the wideband codebook represents the component of the precoding operation that exhibits little or no variation over frequency (over the frequency of the downlink MIMO signal transmitted by the eNodeB). The frequency-selective codebook represents the component of the precoding operation that varies (e.g., in amplitude and/or phase of the various precoding weights) from one spectral sub-band to another. In these embodiments, each sub-sampled codebook is defined as a combination of a subset of the wideband codebook and a subset of the frequency-selective codebook.

In some embodiments, the UE is configured to hold multiple sub-sampled codebooks corresponding to various ranks (i.e., for each possible number of simultaneous data streams that may be transmitted to the UE). The UE calculates the precoding feedback by first selecting the appropriate sub-sampled codebook for the applicable rank, and then chooses the preferred precoding matrices from the selected sub-sampled codebook.

In the disclosed embodiments, each sub-sampled frequency-selective (W2) codebook is represented using no more than two bits. In other words, for any given rank, the sub-sampled frequency-selective codebook comprises no more than four precoding matrices selected from the frequency-selective codebook of the master codebook. Several examples of sub-sampled codebooks for various ranks are described in detail below.

The methods and systems described herein are designed to optimize the sub-sampling of the master codebook, so as to provide accurate precoding feedback using the limited bandwidth resources of the PUSCH. By providing accurate precoding feedback, the disclosed techniques enable the eNodeB to improve system performance, e.g., increase downlink throughput and reduce interference to neighboring cells and UEs.

The disclosed techniques are useful, for example, in scenarios where the preferred beam steering directions are highly frequency-selective, such as when using cross-polarized eNodeB antenna configurations. Another cause for frequency-selective precoding feedback is time misalignment between the eNodeB antennas. In such environments, limiting the frequency-selective feedback to a small number of bits is highly desirable because this feedback is transmitted multiple times for multiple spectral sub-bands.

FIG. 1 is a block diagram that schematically illustrates a communication system 20, in accordance with an embodiment that is described herein. System 20 comprises a mobile communication terminal 24, also referred to as a User Equipment (UE). The UE may comprise, for example, a cellular phone, a wireless-enabled mobile computer, or any other suitable type of terminal having communication capabilities. UE 24 communicates with a base station (BS) 28, also referred to as an eNodeB.

In the embodiments described herein, system 20 operates in accordance with the LTE-A specifications. Alternatively, however, system 20 may operate in accordance with any other suitable communication protocol. The example of FIG. 1 shows only a single BS and a single UE for the sake of clarity. Real-life systems, however, typically comprise multiple BSs and multiple UEs.

In the present embodiment, UE 24 comprises one or more antennas 32 for receiving downlink MIMO signals from BS 28 and for transmitting uplink signals to the BS. A downlink receiver (RX) 36 receives the downlink signals and an uplink transmitter (TX) 40 transmits the uplink signals. UE 24 further comprises processing circuitry 44 and a memory 48.

Memory 48 holds a definition 52 of sub-sampled wideband and frequency-selective codebooks, a respective pair of sub-sampled wideband and frequency-selective codebooks per each rank supported by the UE. The wideband and frequency-selective codebooks are also denoted W1 and W2, respectively. In a given pair, the wideband codebook is formed of a subset of the precoding matrices in the wideband codebook of the master codebook. The frequency-selective codebook in the given pair is formed of a subset of the precoding matrices in the frequency-selective codebook of the master codebook. Both subsets of precoding matrices are typically defined in advance, e.g., by simulation, so as to provide optimal precoding accuracy for the given rank.

As will be explained and demonstrated below, each sub-sampled frequency-selective (W2) codebook is represented using no more than two bits, in an embodiment. In other words, for any given rank, the sub-sampled frequency-selective codebook comprises no more than four precoding matrices selected from the frequency-selective codebook of the master codebook.

In the embodiment seen in FIG. 1, processing circuitry 44 comprises a codebook selection unit 56, which selects the appropriate pair of sub-sampled W1 and W2 codebooks for the applicable rank. A feedback calculation unit 60 chooses a preferred precoding scheme based on the received downlink MIMO signal. Unit 60 chooses the precoding scheme from within the pair of sub-sampled codebooks selected by unit 56. The preferred precoding scheme comprises a precoding matrix from the subset of wideband precoding matrices in that pair of codebooks, and one or more precoding matrices (corresponding to one or more respective spectral sub-bands) from the subset of frequency-selective precoding matrices in that pair of codebooks.

Feedback calculation unit 60 formats precoding feedback that is indicative of the preferred precoding scheme. The precoding feedback uses some or all of the available bits in the PUSCH. Unit 60 provides the precoding feedback to uplink transmitter 40, which transmits the precoding feedback to BS 28 over the PUSCH. BS 28 typically decodes the precoding feedback from the PUSCH and uses the feedback in deciding the precoding of subsequent downlink transmissions.

As seen at the bottom of FIG. 1, in this example embodiment the total downlink bandwidth of system 20 is divided into multiple Sub-Bands (SB). For each sub-band, unit 60 calculates and formats a respective frequency-selective (W2) feedback comprising no more than two bits, which indicates the index of the precoding matrix from the frequency-selective (W2) codebook that is preferred for use in this sub-band. In addition, unit 60 calculates and formats wideband (W1) feedback, which indicates the index of the preferred precoding matrix from the wideband (W1) codebook.

The UE configuration shown in FIG. 1 is an example configuration, which is depicted solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including downlink receiver 36, uplink transmitter 40, processing circuitry 44 and/or memory 48, are implemented in hardware, such as implementing receiver 36 and/or transmitter 40 using one or more Radio Frequency Integrated Circuits (RFICs), or implementing processing circuitry 44 using one or more Field-Programmable Gate Arrays (FPGAs) or Application-Specific Integrated Circuits (ASICs). Memory 48 comprises any suitable type of memory device, for example Random Access Memory (RAM) or non-volatile memory such as Flash memory.

In alternative embodiments, certain UE elements are implemented in software, or using a combination of hardware and software elements. In some embodiments, some or all of the elements of UE 24, including receiver 36, transmitter 40, processing circuitry 44 and/or memory 48, are implemented in a signal processing chip-set for use in mobile communication terminals.

In some embodiments, certain UE elements, such as certain elements of processing circuitry 44, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As explained above, in some embodiments UE 24 transmits frequency-selective precoding feedback to eNodeB 28. In an embodiment, the UE transmits one precoding matrix selected from the appropriate sub-sampled wideband (W1) codebook, and multiple precoding matrices (for use in respective multiple sub-bands) selected from the appropriate sub-sampled frequency-selective (W2) codebook. Feedback of this sort, which is transmitted over PUSCH, is described in 3GPP TSG-RAN document R1-105883, entitled "Details of PUSCH 3-2 for 8TX," November, 2010, which is incorporated herein by reference.

In the embodiments disclosed herein, the sub-sampled frequency-selective codebooks are defined such that the frequency-selective feedback for each sub-band comprises no more than two bits. In other words, each sub-sampled frequency-selective codebook comprises no more than four precoding matrices.

UE 24 may use the remaining PUSCH bits for any other suitable purpose. In an embodiment, the remaining PUSCH bits are used for improving Multi-User MIMO performance, for example by transmitting Multi-User Channel Quality Indicators (MU-CQI) feedback. MU-CQI feedback schemes are addressed, for example, in U.S. patent application Ser. No. 13/253,078, entitled "Enhanced channel feedback for multi-user MIMO," which is assigned to the assignee of the present patent application and whose disclosure is incorporated herein by reference.

In an example embodiment, UE 24 uses a master W1 and W2 codebook given in the following table:

TABLE 1

Example master codebook

| Rank Indicator (RI) | # of bits in W1 FB | W1 precoding matrix indices | # of bits in W2 FB | W2 precoding matrix indices | Total # of FB bits |
|---|---|---|---|---|---|
| 1 | 4 | {0, 1, 2, ..., 14} | 2 | {0, 1, 2, 3} 4 phases | 6 |
| 2 | 4 | {0, 1, 2, ..., 14} | 2 | {0, 1, 4, 5} | 6 |
| 3 | 3 | {0, 1, 2, ..., 7} | 2 | {0, 2, 8, 10} | 5 |
| 4 | 3 | {0, 1, 2, ..., 7} | 2 | {0, 1, 4, 5} | 5 |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | 0 | 0 | {0} | 0 |

The indices of the W1 and W2 precoding matrices in Table 1 follow the notation of the 3GPP TS 36.213 specification, cited above. In this specification, each of the W1 and W2 codebooks comprises sixteen precoding matrices having indices {0, 1, 2, 3, ..., 15}. In the master codebook given in Table 1, the W2 codebook size is already reduced to two bits for ranks 1-4 (RI=1, 2, 3 or 4), i.e., for up to four simultaneous data streams transmitted to the UE.

As can be seen in the table, above rank 4 (for RI=5, 6, 7 or 8) the W2 codebook comprises only a single precoding matrix {0}. In other words, for ranks higher than four, the W2 codebook is assigned zero feedback (FB) bits. The choice of assigning zero W2 feedback bits for ranks higher than 4 is made purely by way of example. In alternative embodiments, zero W2 feedback bits (i.e., a single constant W2 precoding matrix) can be assigned for ranks that exceed any other predefined rank threshold. For example, Table 1 can be modified such that the W2 indices are set to {0} (zero W2 feedback bits) for RI>2.

In an embodiment, when UE 24 comprises two antennas 32, the UE uses the sub-sampled W1 and W2 codebooks given in the following table:

TABLE 2

Example sub-sampled codebook for 2-antenna UE, derived from the master codebook of Table 1

| Rank Indicator (RI) | # of bits in W1 FB | W1 precoding matrix indices | # of bits in W2 FB | W2 precoding matrix indices | Total # of FB bits |
|---|---|---|---|---|---|
| 1 | 4 | {0, 1, 2, ..., 14} | 2 | {0, 1, 2, 3} | 6 |
| 2 | 4 | {0, 1, 2, ..., 14} | 2 | {0, 1, 4, 5} | 6 |

In another embodiment, when UE 24 comprises four antennas 32, the UE uses the sub-sampled W1 and W2 codebooks given in the following table:

TABLE 3

Example sub-sampled codebook for 4-antenna UE, derived from the master codebook of Table 1

| Rank Indicator (RI) | # of bits in W1 FB | W1 precoding matrix indices | # of bits in W2 FB | W2 precoding matrix indices | Total # of FB bits |
|---|---|---|---|---|---|
| 1 | 4 | {0, 1, 2, ..., 14} | 2 | {0, 1, 2, 3} | 6 |
| 2 | 4 | {0, 1, 2, ..., 14} | 2 | {0, 1, 4, 5} | 6 |
| 3 | 3 | {0, 1, 2, ..., 7} | 2 | {0, 2, 8, 10} | 5 |
| 4 | 3 | {0, 1, 2, ..., 7} | 2 | {0, 1, 4, 5} | 5 |

Examples of simulation results for the above sub-sampled codebooks are provided in U.S. Provisional Patent Application 61/556,757, cited above. These simulation results show that limiting the W2 feedback to two bits per sub-band has a negligible effect on performance.

In an alternative embodiment, UE 24 uses a sub-sampled codebook given in the following table:

TABLE 4

Example sub-sampled codebook

| Rank Indicator (RI) | # of bits in W1 FB | W1 precoding matrix indices | # of bits in W2 FB | W2 precoding matrix indices | Total # of FB bits |
|---|---|---|---|---|---|
| 1 | 4 | {0, 1, 2, ..., 14} | 2 | {0, 1, 2, 3} | 6 |
| 2 | 4 | {0, 1, 2, ..., 14} | 1 | {0, 1} or {0, 4} | 5 |
| 3 | 3 | {0, 1, 2, ..., 7} | 1 | {0, 2} or {0, 8} | 4 |
| 4 | 3 | {0, 1, 2, ..., 7} | 1 | {0, 1} or {0, 4} | 4 |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | 0 | 0 | {0} | 0 |

In this example, for ranks higher than 1 (RI>1), the W2 codebook is reduced to a maximum of a single feedback bit (a maximum of two W2 precoding matrices).

The precoding schemes described in Tables 1-4 above are chosen purely by way of example. In alternative embodiments, UE 24 may use any other suitable precoding scheme that allocates no more than two feedback bits for the frequency-selective (W2) feedback.

Figure 2:
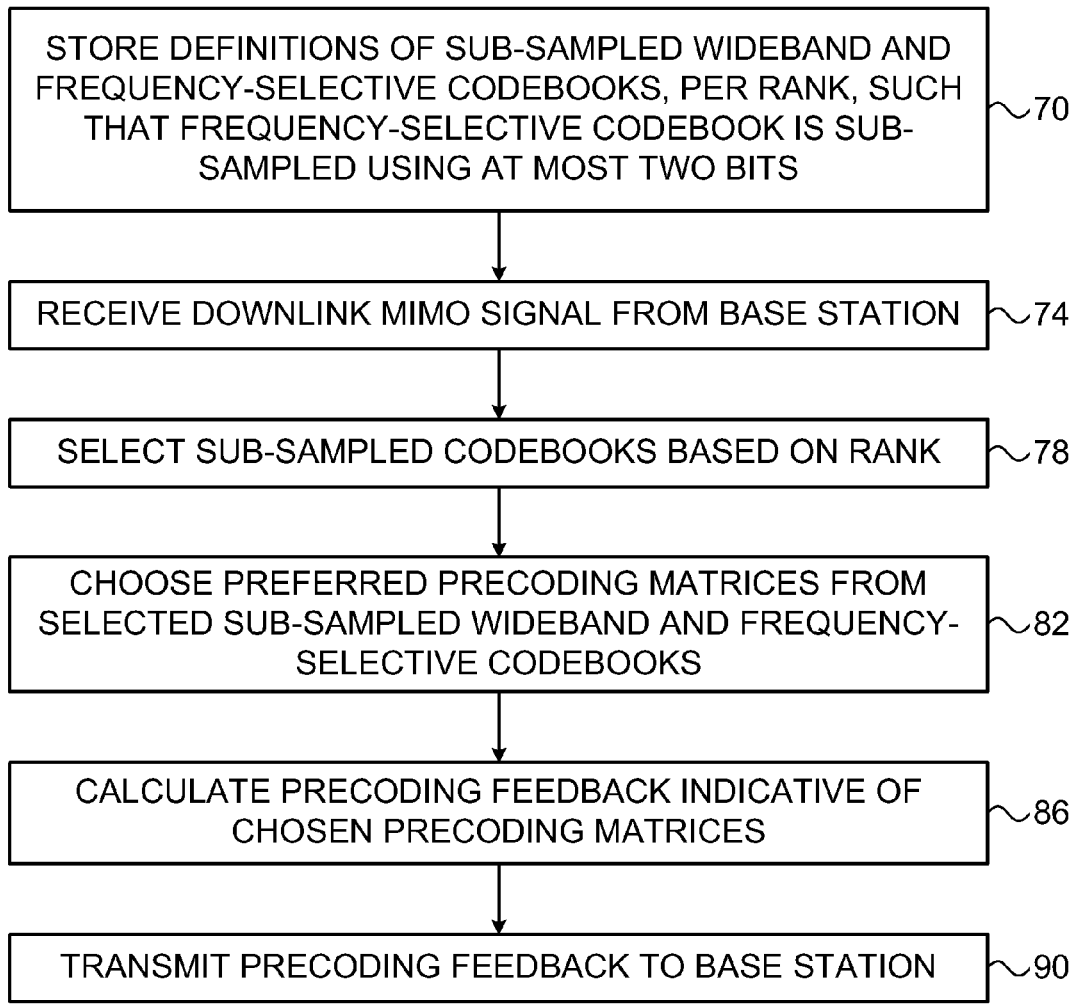
FIG. 2 is a flow chart that schematically illustrates a method for providing precoding feedback, in accordance with an embodiment that is described herein.

FIG. 2 is a flow chart that schematically illustrates a method for providing precoding feedback, in accordance with an embodiment that is described herein. The method begins with UE 24 storing in memory 48 a definition 52 of wideband and frequency-selective codebooks, sub-sampled per rank, at an initialization operation 70. Any suitable sub-sampled codebooks, such as the codebooks described above, can be used. Typically, the codebooks are sub-sampled such that the W2 (frequency-selective) codebooks each comprises no more than four precoding matrices, and is thus encoded using no more than two feedback bits.

Downlink receiver 36 receives a downlink MIMO signal from eNodeB 28, at a reception operation 74. Codebook selection unit 56 selects the appropriate sub-sampled W1 and W2 codebook for the applicable rank, at a codebook selection operation 78.

Based on the received downlink MIMO signal, feedback calculation unit 60 chooses a preferred pre-coding scheme from the selected sub-sampled codebook, at a precoding scheme selection operation 82. The selected precoding scheme typically comprises a precoding matrix from the selected sub-sampled W1 codebook, and multiple precoding matrices (for use in respective sub-bands) from the selected sub-sampled W2 codebook.

Feedback calculation unit 60 calculates precoding feedback that is indicative of the chosen preferred precoding scheme, at a feedback calculation operation 86. Unit 60 provides the precoding feedback to uplink transmitter 40. The uplink transmitter transmits the precoding feedback to eNodeB 28 over the PUSCH, at an uplink transmission operation 90. The eNodeB typically configures (e.g., precodes) its subsequent downlink transmissions using the feedback.

In various embodiments, the sub-sampled codebooks described herein can be used in different PUSCH feedback modes, whether specified or contemplated, such as the PUSCH 3-2 or PUSCH 2-2 modes. In some embodiments, for high-speed channels the UE uses a 3-bit W2 sub-sampled codebook such as {0, 1, 2, 3, 8, 9, 10, 11}. In another embodiment, the sub-sampled W2 codebook assigns one bit for encoding the relative phase between antennas and one bit for encoding the beam steering angle (e.g., using Discrete Fourier Transform—DFT-matrices), such as in {0, 2, 8, 10}. (Again—the precoding matrix indices follow the notation of the 3GPP TS 36.213 specification.) In yet another example embodiment, the rank 1 W2 codebook is not sub-sampled, and sub-sampling is performed only for higher ranks.

In some embodiments, in addition to providing frequency-selective precoding feedback, UE 24 also provides frequency-selective CQI feedback. In other words, UE 24 calculates and transmits multiple CQI values for multiple spectral sub-bands. In an embodiment, feedback calculation unit 60 applies differential encoding to the multiple CQI values, i.e., transmits only the differences between them and some reference CQI (e.g., the wideband CQI).

In an example embodiment, unit 60 differentially-encodes the CQIs using two bits according to the following table:

| Sub-band differential CQI index | Offset level |
|---|---|
| 0 | 0 |
| 1 | 1 |
| 2 | $\geq 2$ |
| 3 | $\leq -1$ |

Certain aspects of differential CQI encoding are addressed in the 3GPP TS 36.213 specification, cited above. For RI>1, in an embodiment, the wideband CQI values for the two code words are differentially encoded according to Table 7.2-2 of 3GPP TS 36.213.

It is noted that the embodiments described above are cited by way of example, and that the present invention is not limited to what has been particularly shown and described hereinabove. Rather, the scope of the present invention includes both combinations and sub-combinations combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a mobile communication terminal, holding a definition of a sub-sampled codebook identifying precoding matrices, which are selected from a master codebook that is made-up of a wideband codebook and a frequency-selective codebook, wherein the definition defines a first subset of the wideband codebook and further defines a second subset of the frequency-selective codebook, wherein the second subset of the frequency-selective codebook is represented using no more than two bits;
receiving in the terminal a Multiple-Input Multiple-Output (MIMO) signal;
based on the received MIMO signal, selecting from the first subset a single precoding matrix, and selecting from the second subset multiple precoding matrices corresponding to multiple respective spectral sub-bands, for precoding subsequent MIMO signals transmitted to the terminal, and calculating precoding feedback indicating the single precoding matrix selected from the first subset and the multiple precoding matrices selected from the second subset; and
transmitting the precoding feedback from the terminal.

2. The method according to claim 1, wherein holding the definition comprises defining multiple first subsets and multiple second subsets for multiple respective ranks of the MIMO signal.

3. The method according to claim 2, wherein defining the second subsets comprises defining each second subset to include only a single precoding matrix for any rank that is higher than a predefined threshold rank.

4. The method according to claim 2, wherein defining the second subsets comprises defining each second subset to include no more than two precoding matrices for any rank that is higher than a predefined threshold rank.

5. The method according to claim 1, wherein transmitting the precoding feedback comprises sending the precoding feedback over a Physical Uplink Shared Channel (PUSCH).

6. The method according to claim 1, wherein the wideband codebook and the frequency-selective codebook are each formed of sixteen precoding matrices having first indices {0 ... 15} and second indices {0 ... 15}, respectively, wherein the first subset is formed of the precoding matrices having the first indices {0,1,2,...,13,14}, and wherein the second subset is formed of the precoding matrices having the second indices {0,1,2,3} or the precoding matrices having the second indices {0,1,4,5}.

7. The method according to claim 1, wherein holding the definition comprises sub-sampling the master codebook only for ranks of the MIMO signal that are higher than one.

8. The method according to claim 1, wherein calculating the feedback comprises calculating multiple Channel Quality Indicators (CQIs) for multiple respective spectral sub-bands, and differentially encoding the multiple CQIs.

9. Apparatus, comprising:
a memory, which is configured to hold a definition of a sub-sampled codebook identifying precoding matrices, which are selected from a master codebook that is made-up of a wideband codebook and a frequency-selective codebook, wherein the definition defines a first subset of the wideband codebook and further defines a second subset of the frequency-selective codebook, wherein the second subset of the frequency-selective codebook is represented using no more than two bits;
a receiver, which is configured to receive a Multiple-Input Multiple-Output (MIMO) signal;
processing circuitry, which is configured to select from the first subset a single precoding matrix, and to select from the second subset multiple precoding matrices corresponding to multiple respective spectral sub-bands, for precoding subsequent MIMO signals transmitted to the receiver, and to calculate precoding feedback indicating the single precoding matrix selected from the first subset and the multiple precoding matrices selected from the second subset; and
a transmitter, which is configured to transmit the precoding feedback.

10. The apparatus according to claim 9, wherein the memory is configured to hold multiple first subsets and multiple second subsets for multiple respective ranks of the MIMO signal.

11. The apparatus according to claim 10, wherein the memory is configured to hold in each second subset only a single precoding matrix for any rank that is higher than a predefined threshold rank.

12. The apparatus according to claim 10, wherein the memory is configured to hold in each second subset no more than two precoding matrices for any rank that is higher than a predefined threshold rank.

13. The apparatus according to claim 9, wherein the transmitter is configured to transmit the precoding feedback over a Physical Uplink Shared Channel (PUSCH).

14. The apparatus according to claim 9, wherein the wideband codebook and the frequency-selective codebook are each formed of sixteen precoding matrices having first indices {0 ... 15} and second indices {0 ... 15}, respectively, wherein the first subset is formed of the precoding matrices having the first indices {0,1,2, ... ,13,14}, and wherein the second subset is formed of the precoding matrices having the second indices {0,1,2,3} or the precoding matrices having the second indices {0,1,4,5}.

15. The apparatus according to claim 9, wherein the memory is configured to hold the sub-sampled codebook only for ranks of the MIMO signal that are higher than one.

16. The apparatus according to claim 9, wherein the processing circuitry is configured to calculate multiple Channel Quality Indicators (CQIs) for multiple respective spectral sub-bands and to differentially encode the multiple CQIs, and wherein the transmitter is configured to transmit the differentially-encoded CQIs in the feedback.

17. A mobile communication terminal comprising the apparatus of claim 9.

18. A chipset for processing signals in a mobile communication terminal, comprising the apparatus of claim 9.

* * * * *